United States Patent [19]

Strigle, Jr.

[11] 4,122,011
[45] Oct. 24, 1978

[54] TRICKLING FILTER MEDIA FOR BIOLOGICAL FILTERS

[75] Inventor: Ralph F. Strigle, Jr., Akron, Ohio

[73] Assignee: Norton Company, Worcester, Mass.

[21] Appl. No.: 775,908

[22] Filed: Mar. 9, 1977

Related U.S. Application Data

[63] Continuation-in-part of Ser. No. 579,666, May 21, 1975, abandoned.

[51] Int. Cl.$^2$ .............................................. C02B 1/04
[52] U.S. Cl. ........................................ 210/150; 261/94
[58] Field of Search .................... 55/150, 151; 261/94, 261/98

[56] References Cited

U.S. PATENT DOCUMENTS

| | | | |
|---|---|---|---|
| 3,506,248 | 4/1970 | Starbuck et al. | 261/94 |
| 3,914,351 | 10/1975 | McKeown | 261/98 |
| 3,957,931 | 5/1976 | Ellis et al. | 210/150 X |

*Primary Examiner*—John Adee
*Attorney, Agent, or Firm*—Walter Fred

[57] ABSTRACT

A generally hollow packing element of relatively high surface area having a plurality of open end tubes situated radially within and connected to one another. At least two of the tubes have walls with or without openings therein extending around and inclined relative to each other and at an angle to a central axis of the body. A plurality of ribs are angularly spaced around the axis and include ribs extending between the walls, ribs projecting from and beyond an end of an outer tube and ribs extending from the central axis which divide the body into a plurality of sectors and chambers. Whether stacked or randomly dumped into a vessel the majority of the surface area of the body is inclined and neither parallel nor normal to the axis of the element or the vessel. Hence, liquid treated in a biological trickling filter vessel packed with the elements must undergo a horizontal displacement which tends to correct any initial maldistribution thereof, increase the length of the path of liquid flow and contact time between the liquid and biomass and reduce the velocity of the liquid allowing biomass to become more easily established. Also a continuous slower flow of liquid is maintained across the inclined surface which eliminates stagnation, loss of efficiency, and exerts a scouring action tending to wash away dead biomass to keep activity high and limits the growth of biomass which might tend to plug the openings in the elements.

20 Claims, 22 Drawing Figures

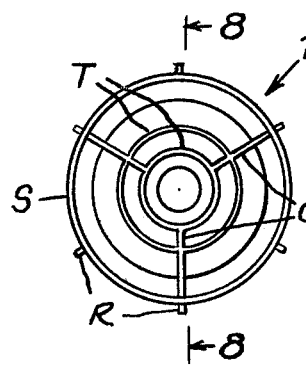
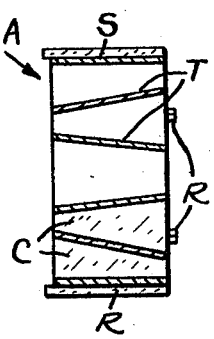
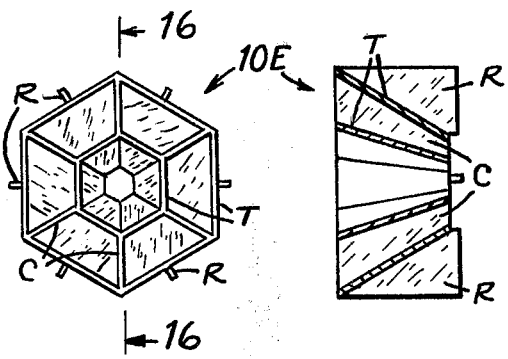
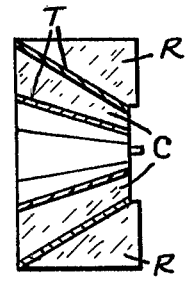
FIG.7  FIG.8  FIG.15  FIG.16
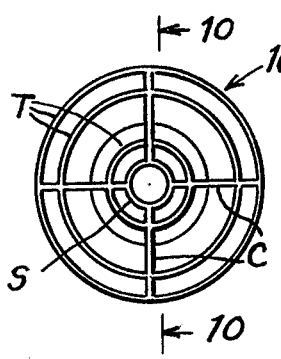
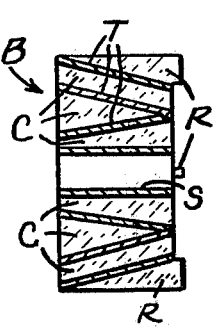
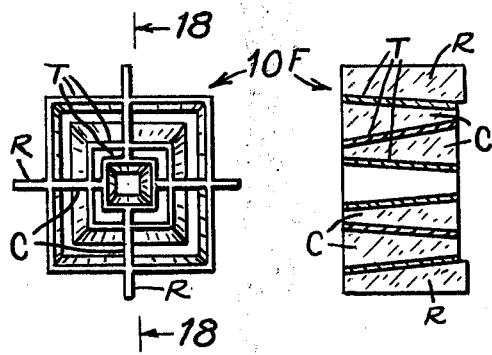
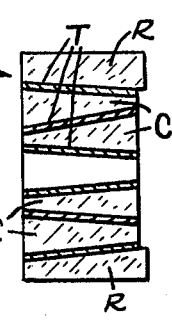
FIG.9  FIG.10  FIG.17  FIG.18
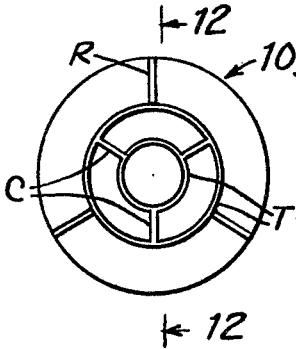
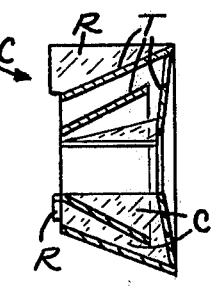
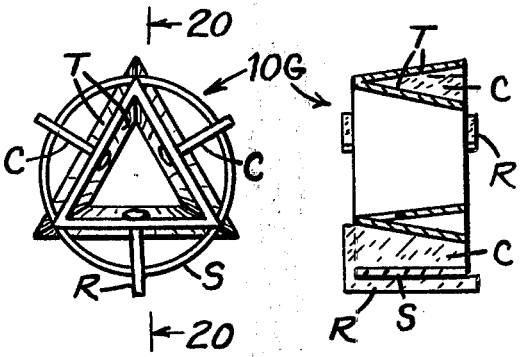
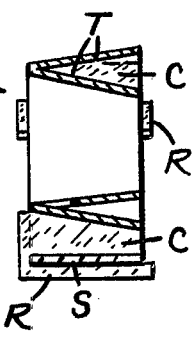
FIG.11  FIG.12  FIG.19  FIG.20
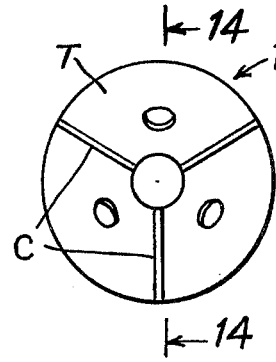
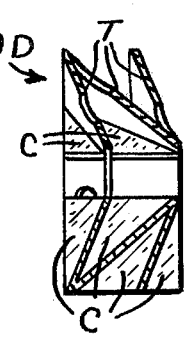
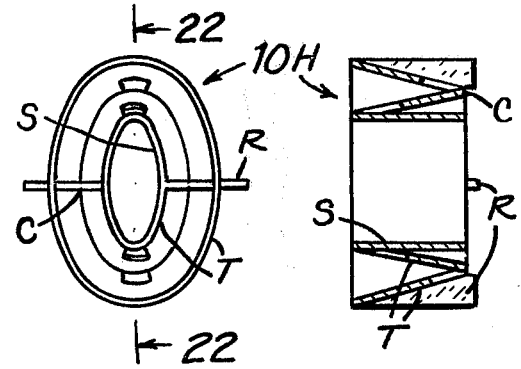
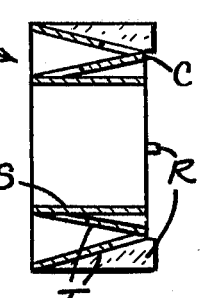
FIG.13  FIG.14  FIG.21  FIG.22

TRICKLING FILTER MEDIA FOR BIOLOGICAL FILTERS

CROSS REFERENCE TO RELATED APPLICATION

This is a continuation-in-part of application Ser. No. 579,666 filed May 21, 1975, now abandoned.

BACKGROUND OF THE INVENTION

1. Field of Invention

The invention relates to packing media and particularly to plastic trickling filter media for biological filters used for the purification of polluted liquids and other effluents.

2. Description of the Prior Art

Heretofore, various forms of media have been proposed for packing both liquid-gas contact towers, biological filter vessels and the like through which the liquid percolates by gravity. In addition to packings made up of stones, rocks, clinker, granite chips there has been previously proposed rigid elements made up of alternately arranged flat and corrugated sheets, spaced corrugated sheets, tubes divided in a honey comb type structure and individual molded elements of various shapes with the aim of providing a large area of exchange contact surfaces.

British Pat. No. 1,275,116 discloses a rigid cylindrical element having a perforated wall and spaced groups of angularly spaced radially extending ribs. U.S. Pat. No. 3,506,248 discloses both cylindrical and polygonal shape plastic elements with a plurality of coaxially aligned spaced parallel walls of different axial length interconnected by ribs or fins. Hence the opposite end portions of the elements have the form of either an inverse truncated cone or polygonal pyramid.

In U.S. Pat. No. 3,365,180 there is disclosed a tubular packing element with elongated, generally ellipsoidal, angularly offset open ends between which extends a single tapered wall surrounding a central opening of irregular shape. The single tapered wall has four side portions each tapered in the opposite direction from the adjacent side portion.

Another packing media is disclosed in U.S. Pat. No. 3,475,012 comprising a plurality of plastic sheets each of which have a plurality of hollow protuberances molded therein to the shape of a frustum of either a cone or pyramid. The sheets are spaced and arranged vertically so the hollow protuberances extend horizontally or transverse to the vertical plane of the tower.

Applicant is also aware of another plastic packing element disclosed in U.S. Pat. No. 3,914,351 and sold under the trade name "Cascade Miniring" by Mass Transfer Limited of Westmoreland, England. Unlike the applicant's element the "Cascade Miniring" has but a single outer perforated tapered wall extending between large and small end diameters of the element.

Applicant's invention is a significant improvement over known prior art media in that a packing thereof provides 40 to 50% of more surface area per cubic unit of measurement than the conventional media which is known to be between 26-29 square feet per cubic foot or 85.3 - 95.1 square meters per cubic meter, and in which the majority of the surfaces are inclined and lie in a diagonal position relative to the axis of the vessel.

SUMMARY OF THE INVENTION

A hollow packing element or body of high surface area for packing trickling filter vessel or tower and the like comprising a plurality of open end tubes with or without perforated walls situated circumferentially or radially within and connected to one another. There are at least two tapered tubes in the body with walls extending around inclined opposite or relative to each other and at an angle to the axis of the element. Preferably, one or more of the tubes of the element have perforated walls with openings of predetermined size and shape.

The element or body preferably comprises an outer tube, an inner tube within and spaced from the outer tube and an intermediate tube situated between and connected to the outer and inner tubes.

The outer or inner or intermediate tube may be either a straight tube or a truncated tapered tube of any one or a combination of any known geometric configurations including hollow truncated cones and pyramids.

The element may further comprise a plurality of ribs, spaced angularly around the axis, extending between and interconnecting the walls of the tubes, short ribs or protrusions projecting from the outer tube and beyond one or both ends of the outer tube, and other ribs extending from the central axis and dividing the element into a plurality of sectors or chambers.

Therefore, the primary object of the invention is to provide an effluent treatment packing element or media of high surface area for packing vessels wherein the majority of its surfaces are neither parallel or normal to its axis or the vertical axis of the vessel packed therewith.

BRIEF DESCRIPTION OF THE DRAWING

FIGS. 7, 9, 11, 13, 15, 17, 19 and 21 are end views of FIGS. 8, 10, 12, 14, 16, 18, 20 and 22 respectively, showing a number of modifications and configurations of the invention; and FIGS. 8, 10, 12, 14, 16, 18, 20 and 22 are cross-sectional views taken on line 8—8, 10—10, 12—12, 14—14, 16—16, 18—18, 20—20 and 22—22 of FIGS. 7, 9, 11, 13, 15, 17, 19 and 21 respectively, showing different arrangements and configurations of a plurality of tubular elements in various modifications of the invention.

DESCRIPTION OF THE PREFERRED EMBODIMENT(S)

Figure 1:
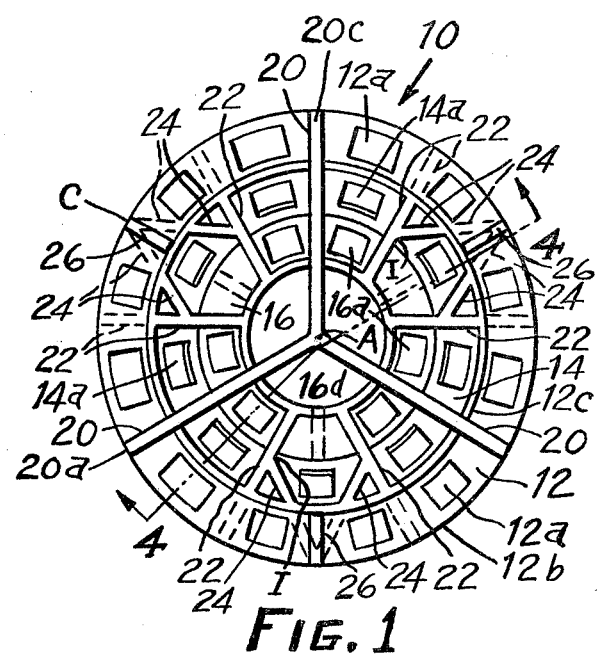
FIG. 1 is a plan view of a preferred embodiment of an effluent treatment element or media of the invention.
Figure 2:
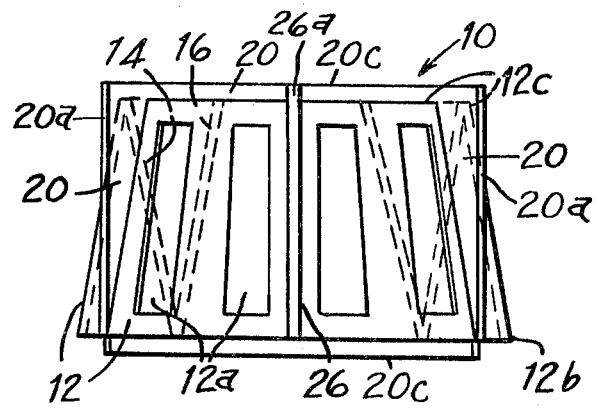
FIG. 2 is a front view of the element shown in FIG. 1.
Figure 3:
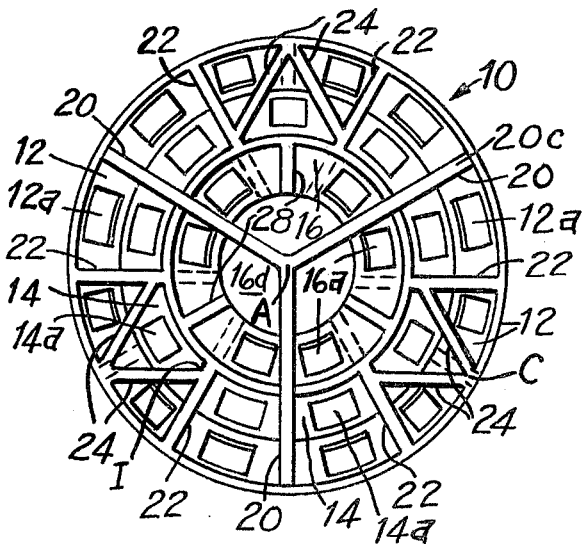
FIG. 3 is a bottom view of the element shown in FIG. 2.

In FIGS. 1-5 of the drawings, there is shown an effluent treatment element, body or media 10 which can be mass produced for packing liquid contact and biological filter vessels or towers and the like used in purification and treatment of effluents and other mass transfer applications.

Preferably, the body or element 10 is an open ended tubular or hollow truncated cone or tapered shape plastic body having an outer tube with a large end or bottom opposite a small end or top and a predetermined height or axial length preferably less than and as shown about ½ of its maximum diameter.

Basically, the element 10 shown for illustrative purposes only, comprises three tubular or hollow truncated cones or tapered tubes 12, 14 and 16 which form the outer intermediate and inner circular inclined walls of the body 10 with each cone or tapered tube having a vertical height or axial length of about 2.25 inches (5.715 cm.) and a relatively thin inclined perforated wall. The outer truncated cone 12 has an inclined wall with a plurality of elongated openings 12a therein, a large end or bottom 12b about 4.38 inches (11.125 cm) in diameter and a top or small end 12c about 3.40 inches (8.636 cm.) in diameter. The inverted intermediate or middle truncated cone 14 has an inclined wall, with openings 14a therein, that slopes in the opposite direction to the outer truncated cone, a large diameter end or top 14b converged with or joined to the small top end 12c of the outer cone and a small end or bottom 14c about 2.42 inches (6.25 cm.) in diameter. The inner hollow truncated cone is substantially parallel to and concentric with the outer cone 12 and has a plurality of openings or windows 16a, a large diameter end or bottom 16b joined to or converged with the small end or bottom 14c of the intermediate truncated cone 14 and a small end or top 16c to which the inner inclined perforated wall extends at an angle to the central axis of the body and the wall of the intermediate inverted cone 14.

Preferably, the walls of the cones 12, 14 and 16 are inclined at an angle of approximately 12° relative to the axis A, and arranged so the wall of the intermediate cone 14 converges in opposite directions with both oppositely inclined walls of the outer cone 12 and inner cone 16 at opposite ends of the cones. However, the inclined angle of the walls can of course be varied within a range of from 1° to 89° relative to the axis A and each other.

The majority of the openings or windows 12a, 14a, and 16a in the truncated cones are angularly spaced around the central axis and substantially aligned adjacent to one another so a radial plane passes through at least a portion of an opening in each of the adjacent walls of and the central axis A of the cones.

Dividing the body 10 into preferably three equal primary sectors or chambers approximately 120° apart are a plurality of angularly spaced, radially and axially or vertically extending primary ribs 20. Preferably, the primary ribs 20 are imperforate, join one another at the central axis A within the inner cone 16 and extend radially from the central axis to outer longitudinal edges or surfaces 20a located at substantially the same radius or radial distance from the axis A as the outer edge of the large end or bottom 12b of the outer cone 12. The outer edge 20a of each primary rib 20 extends either substantially parallel to the axis or tapers inwardly at a slight angle to the axis. The axial length or vertical height of each primary rib 20 is preferably greater than the cones and includes end portions 20c extending beyond the large and small ends of the truncated cones to radial end surfaces of the primary ribs at the opposite ends of the body.

The body 10 and each of the primary sectors or chambers is further divided into a plurality of secondary sectors or chambers by a plurality of secondary ribs 22. In between each angularly spaced pair of primary ribs 20 is a pair of the secondary ribs 22 spaced approximately 60° apart and equally about 30° from the adjacent primary ribs 20. The secondary ribs 22 extend radially from the inner truncated cone to the outer truncated cone and axially between the inclined walls to the opposite large and small end surfaces of the truncated cones 12, 14 and 16.

Figure 4:
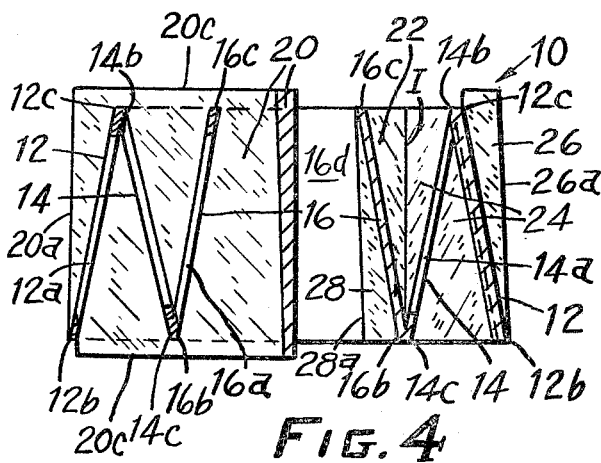
FIG. 4 is a vertical sectional view through the element taken on line 4—4 of FIG. 1.
Figure 5:
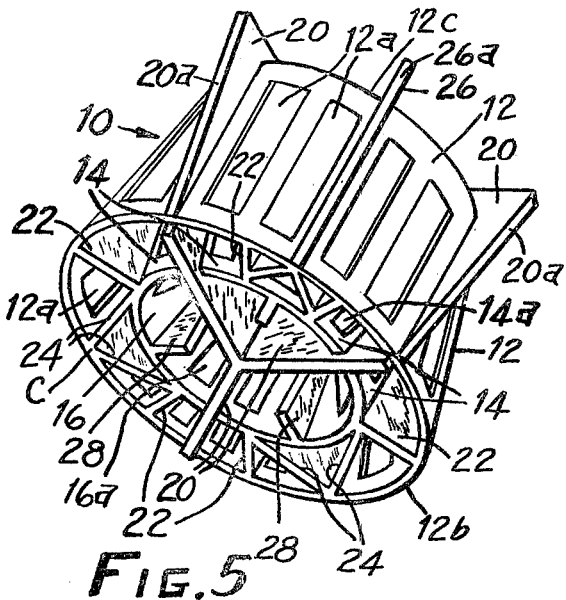
FIG. 5 is a perspective view of the element.

In addition, the body may further comprise a plurality of pairs of tertiary or divergent ribs 24 situated in between each pair of the secondary ribs spaced approximately 60° apart. Each pair of tertiary or divergent ribs 24 originate at line or point of convergence C on the large end of the outer truncated cone midway between each of the angularly spaced pair of primary ribs 20 and secondary ribs 22. Hence, the point or line of convergence C will be preferably about 30° from each of the secondary ribs and about 60° from each of the primary ribs. The tertiary ribs 24 diverge and extend inwardly from the point or line of convergence C on the outer cone to a line of intersection I, with each of the pairs of secondary ribs 22, at a predetermined radial distance from the central axis A. The line of intersection I extends axially between the inner and intermediate walls and the opposite large and small ends of the truncated cones 14 and 16 as shown in FIG. 4.

The tertiary ribs 24 are of substantially the same axial length as the truncated cones and further divides each of the larger intermediate or center one of the three secondary sectors or chambers in each of the primary sectors into a third group or set of three relatively smaller chambers or sectors.

The walls of the cones adjacent the smaller chambers or sectors have openings or windows through which the effluent or liquid being treated can pass. Preferably there is at least one opening in a wall adjacent each chamber or cell of the body 10.

Projecting radially outward from and axially along the outer truncated cone 12 are a plurality of spacer ribs or outer ribs 26 each of which is situated preferably midway between the primary ribs 20 at the point of convergence of the tertiary ribs 24. The outer ribs 26 have substantially the same triangular shape and dimensions and extend substantially the same radial distance from the central axis to an outer longitudinal edge 26a as does the outer portion and edge 20a of the primary ribs 20.

Each of the outer ribs 26 extend axially from the large end of the outer cone 12 to an end surface situated beyond the small end of the outer cone 12 and on substantially the same plane as the end surfaces of the primary ribs 20. The outer longitudinal edges 20a of the primary ribs and 26a of the outer ribs 26 may extend axially substantially parallel to the axis A but preferably have a slight inwardly directed draft or taper from a line of tangency with the large end of the outer cone.

If desired, the body 10 may be further provided as shown with a plurality of equally angularly spaced quaternary ribs or inner ribs 28 extending or projecting radially inwardly into the tapered bore or conical opening 16d from the wall of the inner cone 16. The inner ribs 28 are situated preferably in a radial plane midway between and at an angle of approximately 60° from the primary ribs 20. Each of the inner or quaternary ribs 28 extend both radially and axially from the small end to the large end of the inner cone 16, are of triangular shape and have inner longitudinal edges 28a which may be substantially parallel to the axis A of the body 10. However, each of the edges 28a may have a suitable slight draft and taper outwardly relative to the axis from a line of tangency with the small end of the cone 16 nearest the axis, to the large end of the cone 16 as shown in FIG. 4.

Although the walls of the cones and of the ribs may be straight and of substantially uniform thickness, they are preferably slightly tapered. Hence, the thickness of the walls and ribs will be slightly greater at the small end of the cones.

As shown, the body 10 has 27 openings or windows of which the inner cone 16 has 6 windows or openings 16a, each located in a secondary sector lying between a primary rib 20 and a secondary rib 22. The intermediate inverted cone 14 has 9 windows 14a, one in each of the secondary sectors located between the two or pair of tertiary ribs 24 and a primary rib 20 and a secondary rib 22. In the outer cone 12 are 12 windows 12a, one in each of the secondary sectors located between a primary rib and a secondary rib and one located in each of the smaller chambers or sectors between a tertiary rib 24 and a secondary rib 22.

The windows can be of any desired shape which preferably provides an open area of about 0.56 square inches (3.6 cm$^2$) extending substantially to the point of convergence of the walls of adjacent cones to eliminate liquid trapping pockets. Preferably, the windows or openings are trapizoidal in shape and have a slant height or length along the sloped or inclined surfaces of the cones of about 1.12 inches (2.84 cm.) that is centered between the large and small ends of the cones. The sides of the window may converge in the same direction as the conical surface converges and have an average width of about 0.50 inches (1.27 cm.). Alternatively, the width of the window in one cone may be larger or smaller than those in another cone. However, the minimum width of the window at any point should be at least 0.40 inches (1.02 cm.) and any reduction in size or area of a window in an adjacent cone can be compensated for by a corresponding increase in the size or area of the windows in an adjacent cone in order to maintain the desired total open area and surface contact area in the body.

The filter media, element or body 10 may be fabricated or molded into a single integral structure in any conventional well known manner of various types of metals, ceramics and plastic materials suitable for the particular purpose and the environment in which it is utilized. Preferably the body 10 is an integral structure injection molded of a suitable synthetic plastic material that is inert to the substances being treated and with which it comes in contact. The plastic material may be polypropylene, polyvinyl chloride, polyethylene, nylon, and halogenated polyolefins.

Although a packing element 10 of a particular configuration and specific dimensions has been disclosed, it is obvious that the configuration and the dimensions of the element 10 can be modified without departing from the basic concept of the invention. The basic concept being that each element 10 have a plurality of tubes at least two or a majority of which are tapered tubes each having a wall extending around inclined opposite or relative to the wall of the other tapered tube and at an angle to a central axis of the element whereby at least two walls will be inclined relative to each other and the majority of its surface will be inclined and neither parallel nor normal to an axis of the tower or vessel packed therewith.

In FIGS. 7 through 22 there are shown a plurality of alternative embodiments of tubular packing elements 10A through 10H constructed in accordance with the invention. Each of the packing elements or bodies 10A, 10B, 10C, 10D, 10E, 10F, 10G and 10H are similar in most respects to the element 10 described and to each other in that they all comprise a plurality of adjacent open end tubes situated circumferentially or radially within and connected to one another. However, either the number, configuration or arrangement of the tubes varies between the various embodiments shown. The tubes are connected together by connectors C which in some instances are joined end portions of the walls of two or more tubes and in other instances vanes or ribs extending between spaced walls of the tubes.

Also, there are at least two tapered tubes T in each of the elements with either imperforated or perforated walls extending around and inclined either opposite or relative to each other and at an angle to the central axis of the element. In some embodiments there are one or more straight tubes S in addition to two or more tapered tubes T. In other embodiments all of the tubes are tapered and have walls inclined at one or more different angles to both the axis of the element and a wall of another of the tubes in the element.

As disclosed in the drawings the packing elements may comprise tubes of equal axial length, situated wholly within one another both axially and circumferentially or radially around the central axis as shown in FIGS. 1–10 and 15–22. Also, as shown in FIGS. 11–14 the packing elements may comprise tubes of equal or different axial length situated circumferentially one within the other and have all, or a part of or no part of their axial length situated axially within another tube extending circumferentially around it and the central axis. For example, in FIGS. 13 and 14, the intermediate tube extends beyond the ends of the outer and inner tubes and is situated at least partially axially within the outer tube. That is it has a portion of its axial length situated axially within an outer tube of shorter axial length extending around it. The inner tube is situated axially wholly within an opposite axial part of the longer intermediate tube but is axially spaced or displaced from and therefore has no portion situated axially within the outer tube extending circumferentially around it and the central axis.

Further, the packing elements may have one or more tubes of equal or varying axial length with portions thereof projecting into and situated axially at least partially within portions of one or more other tubes and/or portions projecting beyond an end of one or more of the other tubes in the packing element. Thus one or both ends of one or more tubes may be axially spaced or displaced various or equal amounts relative to the ends of one or more of the other tubes in the packing element and thereby provide packing elements having the desired ratio of axial length to maximum transverse dimension.

The packing elements of the invention are shown in a number of different geometric configurations but are not limited to the specific configurations shown. The tapered tubes T and straight tubes S arranged as shown in the various cross sectional views of the packing elements could have one of many possible configurations different from that specifically shown in the view on which the cross-sectional view was taken. Likewise, any one packing element of the particular configurations shown in the end views can have one of the many arrangements of tubes shown, different from that shown in the cross-sectional view of the corresponding element on which it was taken.

As an example, the hexagonal, square, triangular and elliptical tubes arranged as shown in FIGS. 15–22 could be circular and the circular tubes arranged as shown in FIGS. 7–14 could be either hexagonal, triangular, square or elliptical.

Depending on their configuration, the elements 10A–10H have, in most instances, protuberances, or spacer ribs R protruding outwardly from the outer tube and above one or both ends of the tubes to provide spaces between adjoining elements packed into a vessel. Further the elements may be provided with an additional number of connectors or ribs, outer or spacer ribs, and openings in the ribs and/or wall of the tubes.

Dimensions of the packing element or body will of course depend on its use and purpose but generally the ratio of the maximum transverse dimension of the outer tube of the element to that of the vessel chamber is preferably less than 1:10.

Each packing element of the invention is preferably of shorter axial length than the maximum diameter or transverse dimension of its outermost tube in a ratio ranging from 0.15:1 to 0.8:1 but preferably a ratio in a range of 0.3:1 to 0.6:1.

Also, the total surface area of the inclined walls in each of the elements is preferably greater than the surface area of the ribs.

Obviously, each element can be provided with any number of ribs or protuberances. However, the number of ribs should be sufficient to provide enough mechanical strength to prevent the element from collapsing under the maximum load of elements above it in the vessel.

A molded body 10 of the invention made of polypropylene by the injection molding process to the specific dimensions disclosed hereinabove for illustrative purposes weighs approximately 2 oz. (56.7 grams) has a surface contact area of approximately 1.2 square feet (.111 $m^2$) and open area of about 15 square inches (96.77 $cm^2$) and 33 of the bodies 10 occupy about 1 cubic foot (.0283 $m^3$) of space in the vessel.

Figure 6:
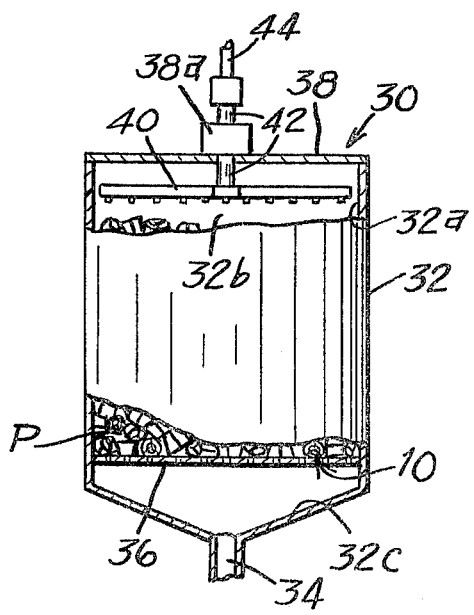
FIG. 6 is a view partly in section of a typical trickling filter vessel packed with an effluent treatment media of the invention.

In FIG. 6 there is diagrammatically shown a biological trickling filter apparatus 30 which is but one of the many conventional types well known to those skilled in the art to which the invention pertains. The apparatus 30, as shown, comprises a vertically extending tower or vessel 32 supported in any well known conventional manner not shown. The vessel 32 has outer shell or sidewall 32a extending around and enclosing a chamber 32b, a downwardly inclined bottom wall 32c extending from the sidewall to an outlet pipe or conduit 34. Above the bottom wall 32 is a perforated packing support plate 36 extending transversely across the chamber and fixedly attached to and supported by the sidewall 32a.

Suitably attached to the top of and supported by the sidewalls 32 is a top plate or cover 38 on which is preferably rotatably supported in a bearing or housing 38a fixed thereto, an effluent or liquid distributor head 40. The distributor 40 may be of any suitable conventional design and have a rotatable hollow shaft 42 journalled in the bearing or housing 38a to which a conventional drive means, such as, a gear reduction motor, not shown, may be coupled to rotate the liquid distributor head 40.

The distributor head 40 obviously has the usual channels and openings or spray nozzles with orifices therein not shown connected to and communicating with a conduit or channel in the shaft 42 to which is coupled an inlet conduit or pipe 44 through which the liquid to be treated is introduced and distributed substantially uniformly by the distributor over the packing P in the chamber. In this instance the packing P in the chamber comprises a plurality of randomly oriented packing elements 10 of the invention which have been dumped into the chamber 32b and supported by the sidewalls 32a and the plate 36. A packing P of the bodies 10 whether dumped or stacked provides a surface area of at least 40 square feet per cubic foot (131.178 $m^2/m^3$) of the chamber packed therewith which is approximately 40–50% greater than a packing of the conventional trickling filter media of the prior art.

In operation the polluted or contaminated effluent or liquid to be treated is distributed initially over the packing P of the bodies or elements 10. Thereafter it percolates or trickles downwardly, due to gravity, through the packing of media 10 which filters out bacteriologically active contaminants therefrom before it passes out the outlet pipe 34.

As the liquid flows downwardly the configuration and inclined surfaces of the elements causes the liquid to flow thereover in a thin film in directions that are inclined to the axis of either the vessel or the element 10. Also, due to the inclined walls of the cones, the velocity of the liquid is reduced thereby increasing the period of time it remains in contact with the surface which allows biomass to more readily adhere to the surface.

In addition to the much increased surface area applicant's invention provides the following advantages:

Whether dumped or stacked, the element has the majority of its surface area located in a position which is neither parallel with or normal to the vertical axis of the vessel which contains it. Thus the liquid falling through the bed under the influence of gravity undergoes a horizontal displacement and frequent changes in direction as it passes through each piece of media. This horizontal displacement tends to correct any initial maldistribution of the liquid onto the packing.

Since the majority of the surface can never be in a completely horizontal plane, biomass adhering to this surface is always subject to a scouring action by the liquid. This tends to keep biomass activity high and limit growth which would tend to plug the voids by constantly washing away the dead biomass.

Since the majority of the surface will never be in a completely vertical position, liquid flow is maintained and prevented from becoming stagnant and liquid residence time always will be greater than in a vertical sheet type media. This means not only higher efficiency because of longer contact between the liquid and the biomass but also that the biomass is more easily established initially since the surface is not subject to such high velocity liquid flow as occurs on vertical surfaces.

The openings in the inclined conical walls are of such size and position as to allow free access to all the surface area by the liquid regardless of the position in which the media is oriented. Also, every individual cell or chamber of the media or element is provided with an opening to provide drainage of the liquid so there are no trapped pools of liquid or stagnant areas which are not effective.

The media or element includes projections around the outside cone as well as above the top and bottom end surfaces to space each piece away from its neighbor and avoid blocking of any surfaces which reduces the effective amount of total surface available in the vessel.

The height to diameter ratio of applicant's element promotes maximum orientation of the surfaces into a diagonal position. It has been discovered from experimentation that rings with heights equal to or greater than the diameter tend to orient preferentially in the horizontal position; while rings with heights of less than 40% of the diameter tend to orient preferentially in the vertical position.

Although, primarily a plastic trickling filter media, it is possible to make the element out of other conventional materials suitable for mass transfer applications.

In addition to the foregoing advantages the applicant's media is relatively inexpensive, highly efficient, light in weight, has sufficient rigidly and strength to withstand the maximum load of the packing of elements piled above it in the vessel without collapsing thereunder.

It is to be understood that the invention is not limited to a packing element of the specific dimensions and configurations described above and various modifications and changes may be made in the embodiment of the invention disclosed hereinabove without departing from the spirit of the invention and includes all modifications and equivalents falling within the scope of the appended claims.

What is claimed is:

1. A packing element comprising:
    an outerwall of tubular shape extending around a central axis of the element;
    an inner wall of tubular shape extending around the central axis, situated circumferentially within and spaced from the outer wall; and
    an intermediate wall of tubular shape situated circumferentially between and connected to the outer and inner walls, at least two of the walls being oppositely inclined relative to each other and at an angle to the central axis.

2. A packing element according to claim 1 wherein the outer and inner walls are inclined at an angle to the axis.

3. A packing element according to claim 1 wherein the inner and intermediate walls are inclined at an angle to the central axis.

4. A packing element according to claim 1 wherein the outer and intermediate walls are inclined at an angle to the central axis.

5. A packing element according to claim 2 wherein the intermediate wall is inclined at an angle to the central axis and at least one of the outer and inner walls and wherein at least one of the walls has at least one end thereof situated axially beyond an end of at least one other of the walls.

6. A packing element according to claim 1 further comprising:
    a plurality of ribs angularly spaced around the central axis and extending between the walls.

7. A packing element according to claim 1 wherein at least one of the walls is perforated.

8. A packing element according to claim 1 further comprising:
    a plurality of spacer elements projecting from the outer wall and beyond at least one end of the outer wall.

9. A packing element comprising:
    a plurality of tapered open end tubes situated circumferentially within and connected to one another, and each of the tubes having
    an inclined wall including inclined surfaces extending between opposite large and small ends of the tube, around the inclined at an angle to a central axis of the element; and the inclined walls and inclined surfaces of at least two of the tubes being oppositely inclined relative to each other.

10. A packing element according to claim 9 further comprising:
    a plurality of ribs angularly spaced around the central axis and extending between inclined walls of the tubes.

11. A packing element according to claim 10 wherein the plurality of tapered tubes comprises:
    an outer perforated truncated cone shaped tube;
    an inner perforated truncated cone shaped tube situated circumferentially within and spaced from the outer tube; and
    an intermediate perforated truncated cone shaped tube situated circumferentially in between and connected to the outer and inner tubes.

12. A packing element according to claim 11 wherein the intermediate perforated truncated cone shaped tube is inverted relative to the outer and inner perforated truncated cone shape tubes and has a large end connected to a small end portion of the outer tube and a small end connected to a large end portion of the inner tube.

13. A packing element according to claim 12 wherein the plurality of ribs includes:
    a plurality of primary ribs extending radially from the central axis to the outer tube and axially between opposite ends of the tubes.

14. A packing element according to claim 13 further comprising:
    a plurality of outer ribs angularly spaced around the outer tube and extending axially between opposite ends of the tubes.

15. A packing element according to claim 14 wherein the primary ribs extend axially beyond opposite ends of the tubes.

16. A packing element comprising:
    a plurality of tubes with at least one open end, situated circumferentially within and connected to one another, at least two of the tubes being tapered and each having
    an inclined wall including inclined surfaces extending around and inclined at an angle to a central axis of the element and oppositely inclined relative to the inclined wall and inclined surfaces of the other tapered tube.

17. A packing element according to claim 16 wherein a majority of the plurality of tubes of the element are tapered tubes and wherein at least one of the tubes has at least one end thereof situated axially beyond an end of at least one other of the tubes.

18. A packing element according to claim 16 wherein the plurality of tubes includes: an outer tube having a maximum transverse dimension greater than a predetermined axial length of the packing element in a ratio of the axial length to the maximum transverse dimension ranging from 0.15:1 to 0.8:1.

19. A packing element according to claim 18 wherein the ratio of axial length to maximum transverse dimension is in a range of 0.3:1 to 0.6:1.

20. A packing for an effluent treatment vessel comprising:
    a plurality of packing elements adapted to be randomly dumped into a vessel and have a majority of their surfaces inclined at an angle to an axis of the vessel and each of the elements comprising:

a plurality of tubes situated circumferentially within and connected to one another and at least two of the tubes being tapered and each having an inclined wall including inclined surfaces extending around and inclined at an angle to a central axis of the element and oppositely inclined relative to the inclined wall and inclined surfaces of the other tapered tube.

* * * * *